3,189,638
10-UNDECENYL ALKYLENE GLYCOL BORATES
Irving S. Bengelsdorf, Santa Ana, Calif., assignor to United States Borax & Chemical Corporation, Los Angeles, Calif., a corporation of Nevada
No Drawing. Filed July 23, 1962, Ser. No. 211,880
4 Claims. (Cl. 260—462)

This invention relates to novel 10-undecenyl alkylene glycol borates and methods for preparing said compounds.

It is, therefore, the principal object of this invention to provide as new compositions 10-undecenyl alkylene glycol borates.

It is a further object to provide a method for preparing said borates.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The compounds provided by this invention are the 10-undecenyl alkylene glycol borates having the formula

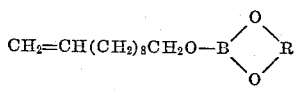

where R is an alkylene radical of 2 to 3 carbon atoms in length and containing a total of 2 to about 20 carbon atoms. When R is an alkylene radical of 2 carbon atoms in length, the compounds contain a 1,3-dioxa-2-borolane ring. When R is an alkylene radical of 3 carbon atoms in length, the boron-containing ring is that of a 1,3-dioxa-2-borinane. The carbon atoms of the rings can be unsubstituted or they can be substituted with lower alkyl groups. The presently preferred compounds are those that have one or more lower alkyl groups, for example, methyl, as substituents on the carbon atoms of the ring.

The borates of this invention are useful as constituents of perfume formulations, as herbicides, fungicides, and as additives for fuel for internal combustion engines.

The novel borates are readily prepared by reaction of 10-undecenyl alcohol with the appropriate alkylene glycol monoborate or a lower alkyl ester of the appropriate glycol monoborate, as illustrated by the following equation

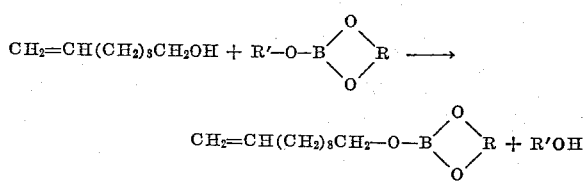

wherein R is an alkylene radical of 2 to 3 carbon atoms in length and containing a total of 2 to about 20 carbon atoms and R' is hydrogen or a lower alkyl group having, for example, 1 to about 8 carbon atoms.

The glycol monoborate reactants are well known to the art and are readily available. Examples of suitable glycol monoborate reactants include:

2-hydroxy-4,4,6-trimethyl-1,3-dioxa-2-borinane
2-hydroxy-4-methyl-1,3-dioxa-2-borolane
2-butoxy-1,3-dioxa-2-borinane
2-hydroxy-4,5-dimethyl-1,3-dioxa-2-borolane
2-ethoxy-4,4,6-trimethyl-1,3-dioxa-2-borinane
2-pentoxy-4,5,5-trimethyl-1,3-dioxa-2-borinane
2-n-butoxy-5-methyl-5-ethyl-1,3-dioxa-2-borinane The reaction takes place at elevated temperatures in a relatively short time. For example, at a preferred reaction temperature of about 50° C. to about 125° C., a good yield of the desired product is obtained in about 1 to 4 hours. The progress of the reaction is easily followed by the formation of the by-product, water or lower alkanol. Preferably, a hydrocarbon solvent is used as a reaction medium so as to maintain close control of the reaction temperature and facilitate removal of the by-products as they are formed, as for example, by azeotropic distillation. The desired product is isolated and purified by conventional procedures well known to those skilled in the art.

Alternatively, the compounds can be prepared by reaction of 10-undecenyl alcohol, boric acid and the corresponding glycol in a direct single-step process as set forth in my copending application with William G. Woods, Serial No. 106,527, filed May 1, 1961, now abandoned.

Examples of representative compounds of this invention include:

2-(10-undecenoxy)-4,4,6-trimethyl-1,3-dioxa-2-borinane
2-(10-undecenoxy)-4,4,5,5-tetramethyl-1,3-dioxa-2-borolane
2-(10-undecenoxy)-5-methyl-5-n-propyl-1,3-dioxa-2-borinane
2-(10-undecenoxy)-4-methyl-1,3-dioxa-2-borinane
2-(10-undecenoxy)-4-methyl-1,3-dioxa-2-borolane
2-(10-undecenoxy)-1,3-dioxa-2-borinane The following examples illustrate the preparation of representative compounds of this invention:

I. A solution of 95.0 grams (0.557 mole) of 10-undecenyl alcohol and 80.3 grams (0.557 mole) of 2-hydroxy-4,4,6-trimethyl-1,3-dioxa-2-borinane in 150 ml. of cyclohexane was stirred in a 500 ml. flask at reflux temperature. The by-product water was removed by means of a Dean-Stark trap as it was formed. Refluxing was continued until the theoretical amount of water had been taken off (about 2.5 hours). The cyclohexane was removed by distillation under reduced pressure to give the crude product as an oily residue. The crude product was distilled under reduced pressure and 2-(10-undecenoxy)-4,4,6-trimethyl-1,3-dioxa-2-borinane collected at 125–127° C./0.4 mm. The product is a colorless, mobile liquid. $n_D^{26}$ 1.4445.

Calculated for $C_{17}H_{33}O_3B$: C=68.9%, H=11.22%, B=3.66%. Found in product: C=68.4%, H=11.3%, B=3.7%.

II. A mixture of 10-undecenyl alcohol (170.1 grams, 1.0 mole), 2,2,4-trimethyl-1,3-pentanediol (146.6 grams, 1.0 mole) and boric acid (62.1 grams, 1.0 mole) was stirred and heated in the presence of 300 ml. toluene. The by-product water was removed with the use of a Dean-Stark trap. Refluxing was continued until the theoretical amount of water (54 ml.) had been liberated (10 hours). The toluene was removed at reduced pressure and the crude oily residue was distilled. The 2 - (10 - undecenoxy)-4-isopropyl-5,5-dimethyl-1,3-dioxa-2-borinane was collected at 165–167° C./0.3 mm. as a colorless, mobile liquid.

Calculated for $C_{19}H_{37}BO_3$: C=70.3%, H=11.5%, B=3.33%. Found in product: C=69.5%, H=11.3%, B=3.43%.

Other modes of applying the principle of the invention may be employed, change being made as regards the details described, provided the features stated in any of the following claims or the equivalent of such be employed.

I, therefore, particularly point out and distinctly claim as my invention:

1. 10-undecenyl alkylene glycol borates having the formula

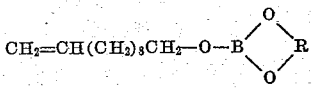

where R is an alkylene radical of 2 to 3 carbon atoms in length and containing a total of 2 to about 20 carbon atoms.

2. 10-undecenyl alkylene glycol borates according to claim 1 in which said alkylene radical has lower alkyl substituents on the carbon atoms of the ring.

3. 2-(10-undecenoxy)-4,4,6-trimethyl-1,3-dioxa-2-borinane.

4. 2-(10-undecenoxy)-4-isopropyl-5,5-dimethyl-1,3-dioxa-2-borinane.

References Cited by the Examiner

UNITED STATES PATENTS 2,413,718  1/47  Lincoln et al. _____ 260—462 X
3,078,296  2/63  Bengelsdorf _____ 260—462

CHARLES B. PARKER, *Primary Examiner.*

L. D. ROSDOL, *Examiner.*